J. C. A. ROHDE.
Air-Filter for Beer-Pumps.
No. 199,577. Patented Jan. 22, 1878.
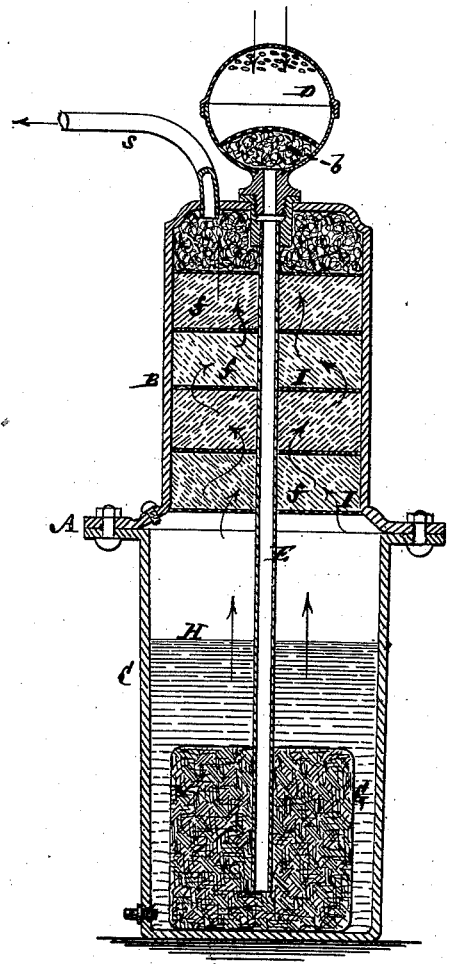

UNITED STATES PATENT OFFICE.

JOHANN CARL ADOLPH ROHDE, OF HAMBURG, GERMANY.

IMPROVEMENT IN AIR-FILTERS FOR BEER-PUMPS.

Specification forming part of Letters Patent No. 199,577, dated January 22, 1878; application filed October 31, 1877.

*To all whom it may concern:*

Be it known that I, JOHANN CARL ADOLPH ROHDE, of Hamburg, Germany, have invented certain new and useful Improvements in Air-Filters for Beer-Pumps and other puposes, of which the following is a description, reference being had to the accompanying drawing, forming part of this specification.

The object of this invention is to purify atmospheric air used in supplying pumps or tanks for delivering beer and other liquids from casks, barrels, or other vessels containing said liquids. It is more particularly, however, designed for purifying air before it is pumped into barrels or casks containing beer, or into tanks for the reception of the air used in delivering the beer, whereby the beer or liquid is exempted from injury by impure air.

The invention relates to a combined wet and dry filtration for such purpose; and consists in a combined dry and wet filter, of novel construction, for purifying the air before its passage to the pumps or tanks used in expelling the beer or other liquid.

It also consists in a novel process of purifying air by wet and dry filtration.

The accompanying drawing represents a sectional elevation of an air-filter constructed in accordance with my invention.

A is the body of the filter, composed of an upper vessel, B, and lower vessel C, secured together by screw-bolts or otherwise. These vessels may be made of cast-iron or other suitable metal or material, protected by enamel on their interior surfaces.

On the top of the upper vessel B is a spherical or other suitably-shaped receptacle, D, perforated on its upper surface for the admission of air to the filter, and furnished with a pipe, E, which is extended to reach nearly down to the bottom of the lower vessel C. Said receptacle D is partly filled with cotton or other suitable substance, $b$, impregnated with salicylic acid, through which the impure air entering the perforated receptacle D passes, for the purpose of cleaning it from grosser mechanical impurities. From thence the air passes, by the pipe E, into a block of charcoal, G, in the lower vessel C, and after permeating said block escapes up through a body of disinfecting liquid, H, which is preferably permanganate of potassa, surrounding the block G. After this, said air is further filtered and purified by circulating up through perforated chambers I, arranged one on top of the other within the upper vessel B, and containing pulverized charcoal, or other dry pulverized disinfectant, $f$. From the top of the upper vessel B the air, purified as described, passes through a suction-pipe, $s$, to the air-pump, and from the latter to the barrels or vessels containing the beer or other liquid to be delivered, or into air-tanks used in connection with said barrels or vessels.

I claim—

1. The combination of the perforated filtering-receptacle D, containing cotton or other substance, charged with a disinfecting acid, the pipe or duct E, the body A of the filter, charged with a liquid disinfectant in its base, the charcoal block G, immersed within said liquid disinfectant, and arranged to receive within it the lower or delivery end of the pipe E, one or more perforated chambers, I, containing a dry pulverized disinfectant, and the suction or discharge pipe or outlet $s$, substantially as herein described.

2. The process of filtering air by passing it first through a loose or fibrous material charged with a disinfecting acid, next through a solid filtering body or block, afterward through a disinfecting liquid, and finally through a pulverized disinfectant, essentially as specified.

JOHANN CARL ADOLPH ROHDE.

Witnesses:
 D. DAUL,
 A. TIMM.